United States Patent [19]

Williams

[11] 4,078,774
[45] Mar. 14, 1978

[54] TRAILER JACK SUPPORT

[76] Inventor: Hugh M. Williams, 34 NE. 37, Oklahoma City, Okla. 73105

[21] Appl. No.: 833,326

[22] Filed: Sep. 14, 1977

[51] Int. Cl.² .............................................. B66F 7/26
[52] U.S. Cl. ................................ 254/45; 254/133 R; 280/477; 280/766
[58] Field of Search ...................... 254/45, 133 R, 134, 254/DIG. 1, DIG. 4; 280/766, 475, 477

[56] References Cited
U.S. PATENT DOCUMENTS 2,852,229  9/1958  Gross .................................. 254/134
3,957,249  5/1976  Williams ............................. 254/45

Primary Examiner—Robert C. Watson
Attorney, Agent, or Firm—Robert K. Rhea

[57] ABSTRACT

A support for a trailer jack, having a vertically extending housing and an extendible plunger telescopically contained by the depending end of the jack housing, includes an upright member mounted on a flat base and having a socket for nesting the depending end of the jack plunger. Hanger arms, on the upper end of the upright member, stores the jack support in a travel position when not in use.

3 Claims, 4 Drawing Figures

TRAILER JACK SUPPORT

BACKGROUND OF THE INVENTION

1. Field of the Invention

The present invention relates to trailer jacks and more particularly to a trailer jack support for underlying and extending the effective length of the jack and including hanger arms for supporting the device in a stored travel position.

It is common practice to connect a jack-type device to the tongue of a trailer, such as a camper trailer, for supporting the trailer tongue in spaced relation with respect to the surface of the earth when the camper trailer is parked for the purpose of leveling the camper trailer. The jack device generally comprises a vertical housing connected with the trailer tongue above the upper limit thereof and includes an extendible plunger selectively moved vertically to an extended ground engaging position when leveling the trailer and to an upward retracted position when the trailer tongue is attached to a towing vehicle. Since the load bearing area of the jack plunger is relatively small, some support means must be provided for the lower end thereof to prevent the plunger being forced into the surface of the earth.

2. Description of the Prior Art

In the past a caster-type wheel unit has been connected with the depending surface of a trailer tongue to support the latter when the trailer is parked, however, this type of support has been generally unsatisfactory for the reason that the wheel tends to roll, if on an inclined surface, and the load bearing surface of the wheel is relatively small and tends to sink into soft ground. The above described trailer jack units have recently come into general use and it is general practice to provide one, or a plurality, of wooden planks or blocks to underlie the depending end of the jack plunger. However, this has the disadvantage that these block units are not easily and conveniently stored for travel and, by age and weathering, tend to deteriorate and eventually crack or split.

The most pertinent prior patent is my U.S. Pat. No. 3,957,249 which discloses a trailer jack foot effectively extending the length of the jack and includes a self-storing feature formed by a pair of superposed U-shaped hangers for engaging flanges attached to the jack.

The principal distinction of this invention over this patent is the elimination of the flanges which must be connected with the jack housing and its extendible member for positioning the jack foot in supporting or stored relation with respect to the jack.

SUMMARY OF THE INVENTION

The jack support is formed by an elongated upright member connected at its depending end with a flat base and provided with a socket in its upper end portion for receiving the depending end of a trailer jack plunger and supporting the latter in spaced relation with respect to the surface of the earth. A U-shaped hanger transversely surrounds the upper end portion of the upright member with its legs projecting beyond the periphery thereof a distance at least equal to the diameter of the upright member for overlying a horizontal flange of a trailer tongue through which the trailer jack projects thus supporting the upright member in parallel relation adjacent the jack. The base is provided with an upwardly open socket having its axis vertically aligned between the legs of the U-shaped hanger for receiving the depending end portion of the jack plunger and maintaining the jack support in a stored travel position.

The principal objects of this invention are to provide a trailer jack support for extending the effective length of a trailer jack while providing security against rolling in which the jack support has no moving parts requiring the use of any tools and incorporating a self storing feature maintaining it in a stored position when not in use and which is economical in construction and simple in operation.

DESCRIPTION OF THE PREFERRED EMBODIMENT

Figure 1:
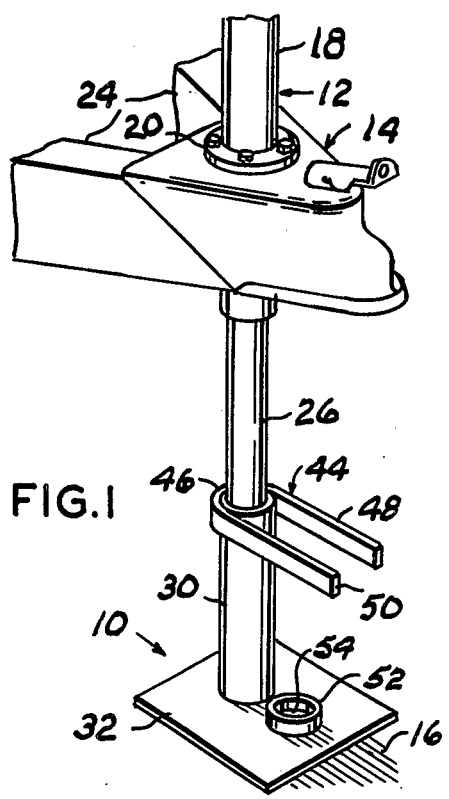
FIG. 1 is a fragmentary perspective view of the jack support operatively supporting the hitch end portion of a trailer tongue.
Figure 4:
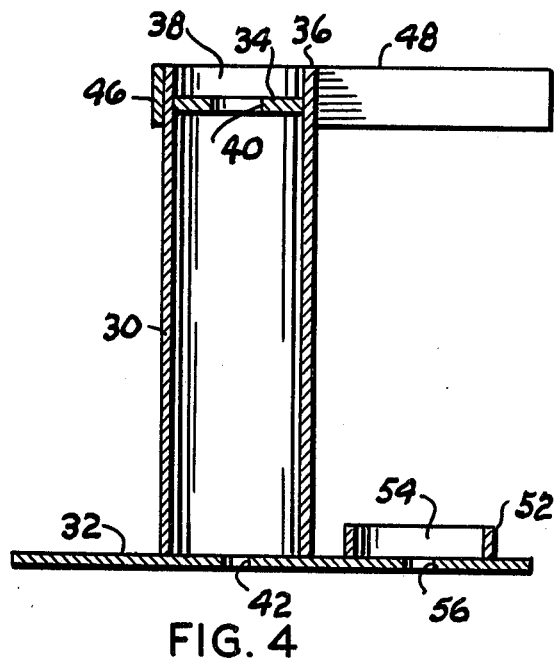
FIG. 4 is a vertical cross sectional view taken substantially along the line 4—4 of FIG. 3.
Figure 2:
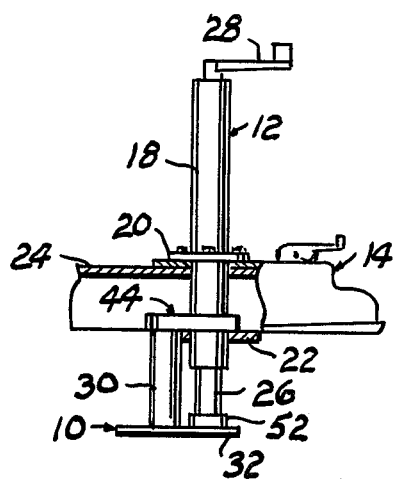
FIG. 2 is a fragmentary elevational view, partially in section, to another scale, illustrating the jack support in stored travel position.
Figure 3:
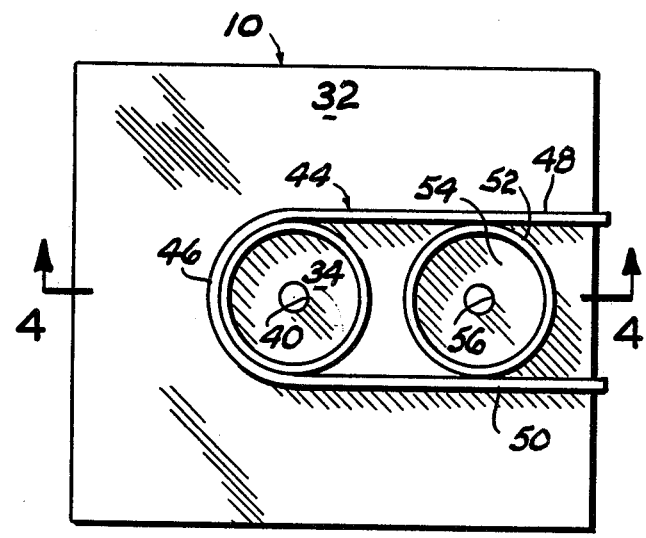
FIG. 3 is a top plan view of the trailer jack support, per se.

Like characters of reference designate like parts in those figures of the drawings in which they occur.

In the drawings:

The reference numeral 10 indicates the trailer jack support constructed in accordance with the present invention. The jack support is intended to be used in combination with a trailer jack 12, mounted on a trailer tongue 14, connected with and supporting a portion of the weight of a trailer, not shown, on the ground indicated by the lines 16. The trailer jack generally comprises a vertical extending housing 18, supported on the trailer tongue 14 by a flange 20 and projecting downwardly below the lower limit of the tongue through a horizontal cross brace 22 underlying and and transversely connected between the converging end portions of the beams 24 forming the trailer tongue. The trailer jack 12 further includes an extendible plunger 26 telescopically received for vertical movement within the jack housing 18, the plunger being raised and lowered by a jack operating handle 28.

The jack support 10 is formed by an upright tubular member 30 secured at its depending end to a flat plate forming a base 32. A transverse partition 34 is secured within the bore of the tube 30 in spaced relation with respect to its upper end 36 to form an upwardly open socket 38 for receiving the depending end portion of the jack plunger 26. The partition 34 is provided with a central aperture 40 for drainage and similarly the base is provided with a drain hole 42 communicating with the bore of the tube 30.

Hanger means 44, comprising a U-shaped member formed from strap metal, or the like, has its bight portion 46 surrounding and flatly secured to a peripheral portion of the tube 30 adjacent its upper end 36. The legs 48 and 50 of the U-shaped hanger form arms which project laterally of the tube 30 in horizontal parallel spaced relation a distance at least equal to the diameter of the tube 30.

A ring member 52, comprising a short length of tubing diametrically equal with respect to the tube 30, is axially connected at one end in upstanding relation to the base 32 to form an upwardly open socket 54 having its axis parallel with the longitudinal axis of the tube 30 and in vertically aligned relation with respect to the space between the hanger arms 48 and 50. Another aperture 56, formed in the base 32, forms a drain hole for the socket 54.

OPERATION

In operation, the trailer support 10 is disposed with its base 32 flatly contacting the surface of the earth with the tube 30 substantially vertically aligned with the trailer jack 12 while the trailer tongue 14 is connected with a towing vehicle, not shown. The jack 12 is actuated to lower its plunger 26 so that its depending end portion is coaxially received by the tube socket 38 to support the tongue 14. The towing vehicle is disconnected from the tongue in a conventional manner and the jack actuated to level the trailer, not shown.

When the trailer is to be moved, the tongue is connected with the towing vehicle in a conventional manner and the jack 12 is actuated to retract its plunger 26 out of the socket 38. The jack support 10 is then manually disposed with its tube 30 in rearward parallel spaced relation with respect to the depending end portion of the jack housing 18 with the hanger arms 48 and 50 disposed on diametrically opposite surfaces of the jack housing 18 and projecting forwardly in overlying relation with respect to the tongue cross brace 22. The jack 12 is actuated to lower its plunger into the ring socket 54 to bear against the upper surface of the base plate 32 with a slight pressure sufficient to rigidly lock the jack support 10 in a stored travel position.

Obviously the invention is susceptible to changes or alterations without defeating its practicability. Therefore, I do not wish to be confined to the preferred embodiment shown in the drawings and described herein.

I claim:

1. In combination with a trailer jack mounted on a trailer tongue having a horizontal cross brace on its depending surface, the trailer jack having a vertically extending housing projecting through the cross brace and having an extendible plunger movable vertically through the depending end portion of the housing, the improvement comprising:

a jack support including an upright member having means for receiving the depending end portion of said plunger to extend the effective length of the jack, and alternately, to overlie the cross brace for storage;

a flat base underlying said upright member; and, a ring secured to said base and forming an upwardly open base socket for receiving the depending end portion of said plunger when the upright member is in storage position.

2. The combination according to claim 1 in which said means comprises a socket formed in the upper end portion of the upright member; and, a pair of hanger arms secured to the upper end portion of said upright member and projecting laterally thereof in parallel spaced relation in cooperative vertical alignment above the base socket.

3. The combination according to claim 1 in which said upright member comprises a tubular member and in which said means comprises:

a partition transversely secured within the bore of the tubular member adjacent its upper end for forming an upwardly open socket; and, a U-shaped member having its bight portion secured to an outer peripheral portion of said tubular member adjacent its upper end, said U-shaped member having legs forming arms respectively disposed on diametrically opposite sides of said tubular member and projecting laterally thereof in parallel spaced relation in cooperative vertical alignment above the base socket.

* * * * *